United States Patent
Kawakita et al.

(10) Patent No.: US 11,991,507 B2
(45) Date of Patent: May 21, 2024

(54) MICROPHONE SETTING ADJUSTMENT BASED ON USER LOCATION

(71) Applicant: Lenovo (Singapore) Pte. Ltd., Singapore (SG)

(72) Inventors: Koji Kawakita, Yokohama (JP); Tin-Lup Wong, Chapel Hill, NC (US); Philip J Jakes, Durham, NC (US); Kazuo Fujii, Yokohama (JP); Kenneth Seethaler, Raleigh, NC (US); David Douglas, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 199 days.

(21) Appl. No.: 17/557,442

(22) Filed: Dec. 21, 2021

(65) Prior Publication Data
US 2023/0199383 A1 Jun. 22, 2023

(51) Int. Cl.
*H04R 3/00* (2006.01)
*G06T 7/70* (2017.01)
*G06V 20/50* (2022.01)
*H04R 1/40* (2006.01)

(52) U.S. Cl.
CPC .............. *H04R 3/005* (2013.01); *G06T 7/70* (2017.01); *G06V 20/50* (2022.01); *H04R 1/406* (2013.01); *G06T 2207/30196* (2013.01); *G06T 2207/30242* (2013.01)

(58) Field of Classification Search
CPC .......... H04R 3/005; H04R 1/406; G06T 7/70; G06T 2207/30196; G06T 2207/30242; G06V 20/50
See application file for complete search history.

(56) References Cited

U.S. PATENT DOCUMENTS

| | | | |
|---|---|---|---|
| 10,834,498 B2 * | 11/2020 | Kapinos | G06V 40/16 |
| 11,077,958 B1 | 8/2021 | Letsu-Dake et al. | |
| 2014/0342714 A1 | 11/2014 | Sanders | |
| 2021/0370836 A1 * | 12/2021 | Xu | H04R 1/406 |

* cited by examiner

*Primary Examiner* — Andrew L Sniezek
(74) *Attorney, Agent, or Firm* — Ference & Associates LLC

(57) ABSTRACT

One embodiment provides a method, including: capturing, using at least one camera sensor coupled to an information handling device, an image of a location; identifying, based upon analysis of the captured image, at least one user position in the location; determining, using a processor, whether a beamforming setting for a microphone array is optimized for the at least one user position; and adjusting, responsive to determining that the beamforming setting for the microphone array is not optimized for the at least one user position, the beamforming setting to an optimized beamforming setting. Other aspects are described and claimed.

19 Claims, 3 Drawing Sheets

MICROPHONE SETTING ADJUSTMENT BASED ON USER LOCATION

BACKGROUND

Individuals may interact with their information handling devices ("devices"), for example smart phones, tablet devices, hybrid devices, laptops, and the like, in a variety of different locations. One popular method of device interaction is through voice input, e.g., individuals may communicate with one or more other individuals through a social chatting application, a remote conferencing application, and the like. Individuals may prefer to have specific microphone settings active on their device based upon the location or situation they are in.

BRIEF SUMMARY

In summary, one aspect provides a method, including: capturing, using at least one camera sensor coupled to an information handling device, an image of a location; identifying, based upon analysis of the captured image, at least one user position in the location; determining, using a processor, whether a beamforming setting for a microphone array is optimized for the at least one user position; and adjusting, responsive to determining that the beamforming setting for the microphone array is not optimized for the at least one user position, the beamforming setting to an optimized beamforming setting.

Another aspect provides an information handling device, including: at least one camera sensor; a processor; a memory device that stores instructions executable by the processor to: capture an image of a location; identify, based upon analysis of the captured image, at least one user position in the location; determine whether a beamforming setting for a microphone array is optimized for the at least one user position; and adjust, responsive to determining that the beamforming setting for the microphone array is not optimized for the at least one user position, the beamforming setting to an optimized beamforming setting.

A further aspect provides a product, including: a storage device that stores code, the code being executable by a processor and comprising: code that identifies, based on context data, a location of an information handling device; code that accesses a setting profile for the information handling device that is based on the identified location; code that determines whether at least one current setting on the information handling device is inconsistent with the settings profile; and code that adjusts, responsive to determining that the at least one current setting is inconsistent with the settings profile, the at least one current setting to match the settings profile for the location.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
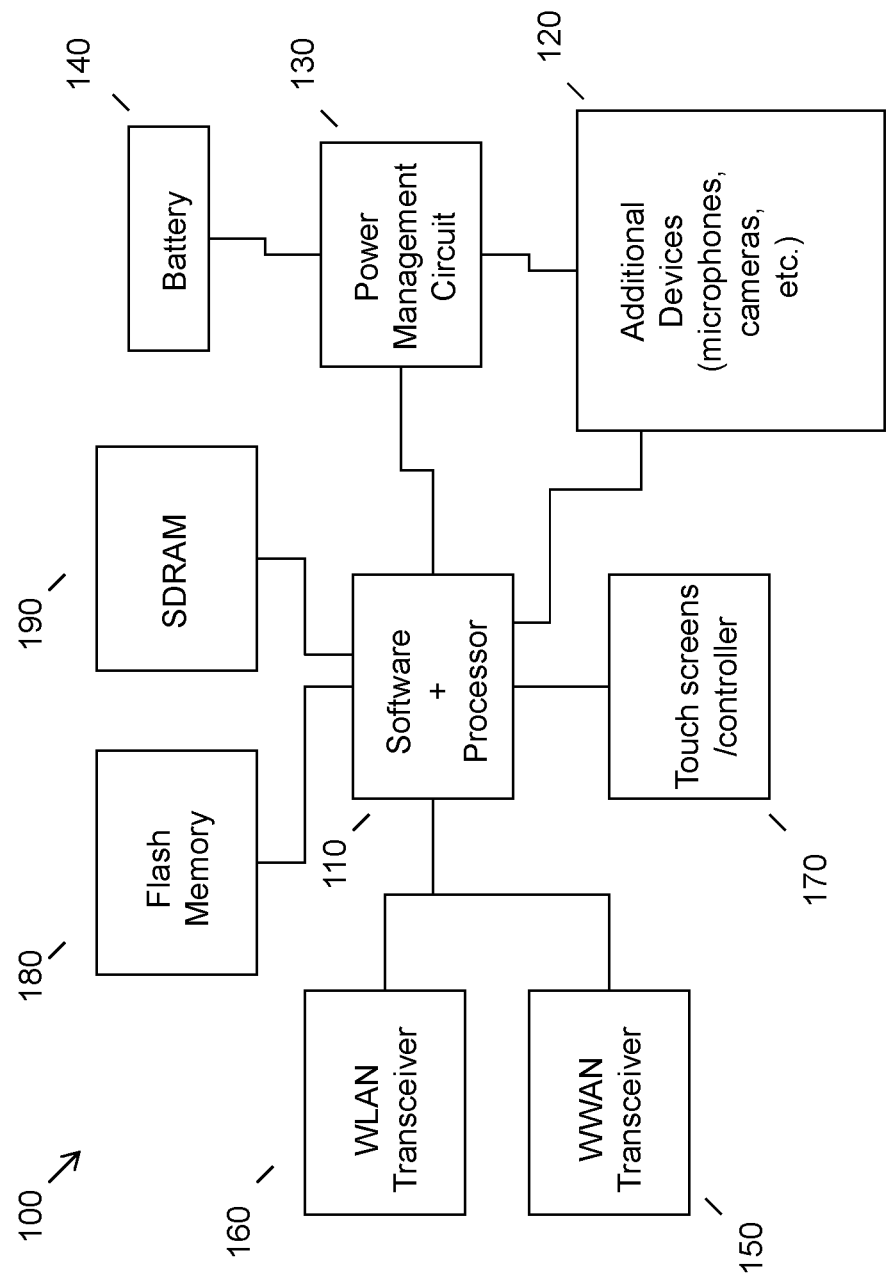
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Advances in microphone technology have led to the development of more efficient audio capture methodologies. For instance, multiple microphones may be configured in an array (i.e., a beamforming array) to form a directional response or beam pattern in which substantially only a device user's voice is captured by the microphone array. This type of beamforming setup may be implemented on various types of user devices and may help to eliminate some or all interfering ambient sound. However, this beam is generally fixed and cannot conventionally adapt to different usage scenarios. For instance, if a user's position with respect to the device changes the user may no longer be in the optimal microphone beam path for their voice input to be captured appropriately. As another example, if a user manually adjusts the microphone beam setting (e.g., by expanding the beam or switching to an omnidirectional audio pickup mode, etc.) then the chance that unwanted sound is captured is increased.

Solutions currently exist that may automatically adjust the beam forming toward the user. For example, one conventional method may automatically adjust a direction and/or pickup range of a microphone array purely based on an audio context (e.g., a direction from which audio is detected, a volume of the audio, etc.). However, with this method the beam may not always be pointed at the user accurately. Additionally, this issue may be further exacerbated when there are multiple individuals in the user's location. More particularly, the system may not be able to effectively capture audio input from all of the relevant users in the location.

Accordingly, an embodiment utilizes knowledge of contextual characteristics associated with a user's location to dynamically optimize microphone beamforming settings. In an embodiment, an image of a user's location may be captured by a camera sensor. An embodiment may then identify, based upon analysis of the captured image, at least one user position in the location (e.g., an actual position of one or more users, an expected position of one or more users, etc.). An embodiment may then determine whether one or more microphone beamforming settings are optimized for the at least one user location and, responsive to determining that they are not, an embodiment may dynamically optimize these settings (i.e., by adjusting them to an optimal form). Such a method may ensure that a microphone array is always optimally oriented with respect to a user's contextual situation.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes an augmented reality device 170 for data input and display/rendering. System 100 also typically includes various memory devices, for example flash memory 180 and SDRAM 190.

Figure 2:
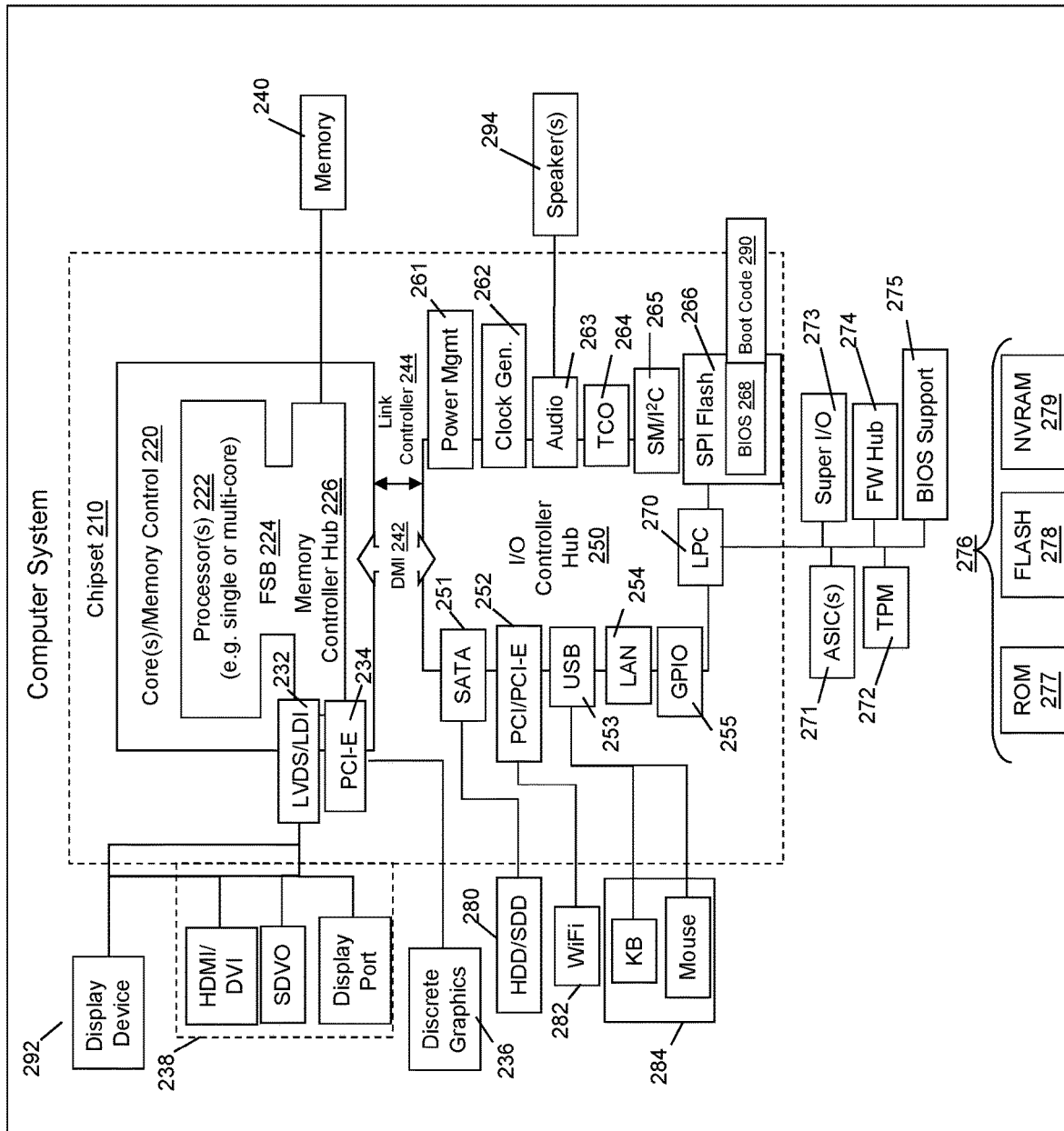
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, NC, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices comprising one or more microphones. For example, the circuitry outlined in FIG. 1 may be implemented in a smart phone, whereas the circuitry outlined in FIG. 2 may be implemented in a personal computer embodiment.

Figure 3:
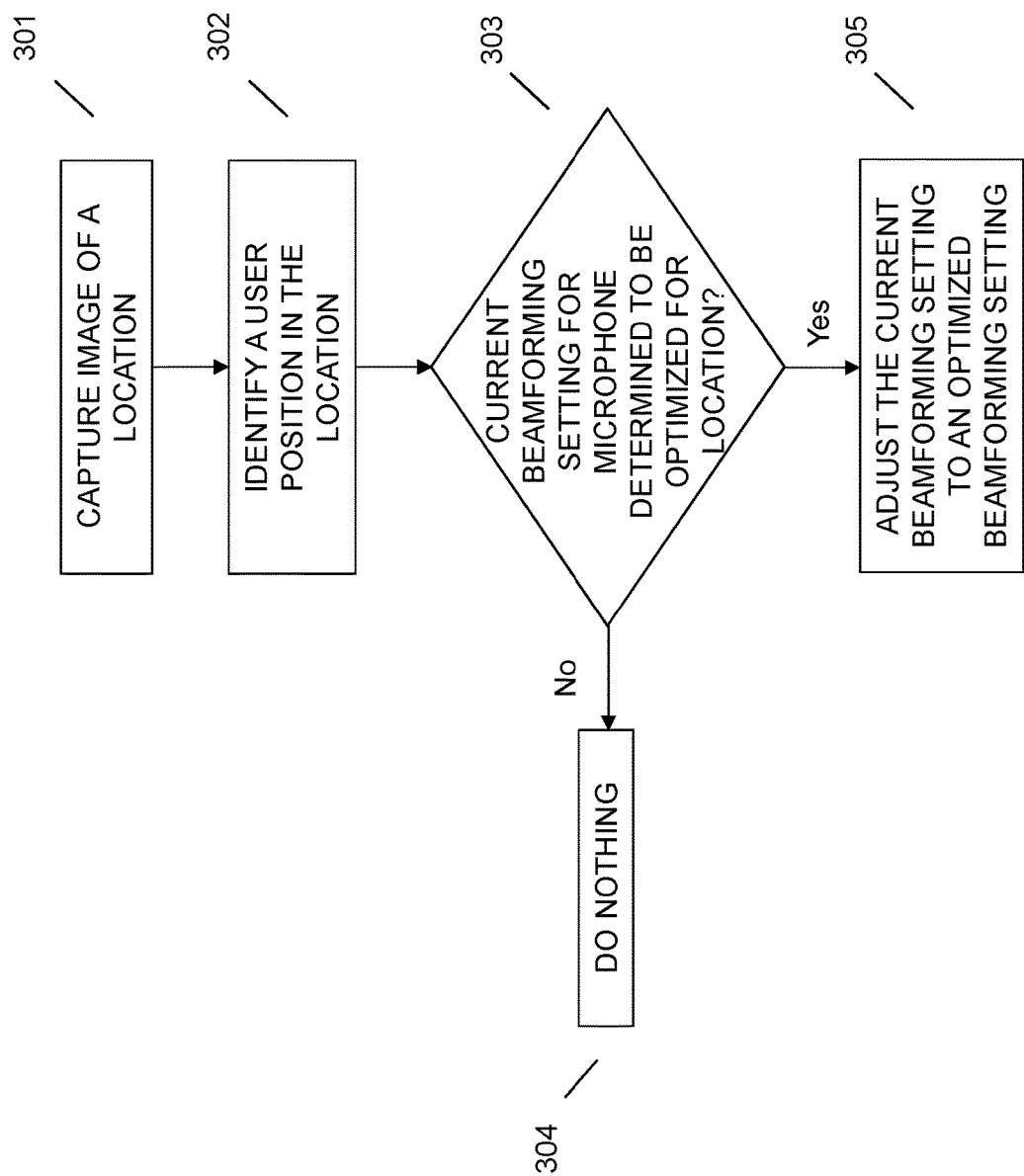
FIG. 3 illustrates an example method of dynamically adjusting at least one setting of a microphone based upon one or more characteristics of a user's location.

Referring now to FIG. 3, an embodiment may automatically optimize a microphone array based upon a user's contextual situation in a location. At 301, an embodiment may capture one or more images of a location of the device. In an embodiment, the image may be a static image or a dynamic image (i.e., a video) and may be captured by one or more camera sensors (e.g., front-facing camera sensors, world-view camera sensors, etc.) integrally or operatively coupled to the device. In an embodiment, the image data may be captured substantially continuously or, alternatively, may be captured in response to detection of a predetermined event (e.g., in response to a user command to capture an image, in response to detection that a user is operating the device, in response to a particularly application being opened, etc.).

At 302, an embodiment may identify a user position in the location. In an embodiment, the user position may correspond to the actual position of one or more individuals in the location. Additionally or alternatively, the user position may correspond to a projected user position of one or more individuals in the location. More particularly, the identification of the projected user position may correspond to an identification of a projected position an individual will be located at a future time, as further described below.

In an embodiment, the identification of the user position may be facilitated by analyzing one or more available pieces of context data associated with the image of the location. For example, the image may be analyzed (e.g., using one or more conventional image analysis techniques, etc.) to identify: a physical position of one or more users in the location, the specific number of users in the location, and/or the identity of one or more users in the location. Additionally or alternatively, the image may be analyzed to identify: a physical position of one or more specific objects in the location, the number of those objects present in the location, and/or the identity of those objects. The identification of the foregoing types of object data may allow a system to identify a projected user location. For example, an embodiment may identify that there are three laptops positioned in front of seats at a conference room table. From this knowledge, an embodiment may conclude that users will eventually be seated at each of those seats and correspondingly establish each of those spots as user positions.

At 303, an embodiment may determine whether a beamforming setting for a microphone array associated with the device is optimized for the identified user position. In an embodiment, the microphone array may be an array of microphones integrally or operatively coupled to the device. In an embodiment, the determination may be facilitated by comparing the existing beamforming settings for the microphone array to a listing of optimized settings for the user's position in the location. In an embodiment, the listing of optimized settings may be stored in an accessible store database (e.g., the database may be stored locally on the device or may be stored remotely on another device or server, etc.). In an embodiment, the optimized settings may be preconfigured settings that were originally designated by a manufacturer of the device. Additionally or alternatively, the original settings may be adjustable by a user of the device (e.g., via navigation through a settings adjustment menu, etc.). In an embodiment, beamforming settings that may be relevant include a range of a beamforming beam (e.g., narrow beam, wide beam, etc.), a target direction of the beamforming beam (e.g., left, right, up, down, etc.), a depth of the beamforming beam (e.g., a shallow depth, moderate depth, deep depth, etc.), and combinations thereof.

As a non-limiting example of the foregoing concepts, an embodiment may identify that there are multiple speakers positioned around a conference room. If a range of the beamforming array is determined to be narrow, then an embodiment may identify that this is not an optimal setting for the user's contextual situation because the microphone array could not effectively capture the voice input from each of the disparately-spaced speakers in the location. As another non-limiting example, an embodiment may identify that a user is positioned near a back portion of a room (i.e., further away from the microphone array). If a depth of the beamforming beam is currently configured to be shallow then an embodiment may conclude that this is not an optimal setting because the microphone array would not be able to register voice input provided by the distant user.

Responsive to determining, at 303, that one or more current beamforming settings for the microphone array are optimized for the user's position in the location, an embodiment may, at 304, take no additional action. Conversely, responsive to determining, at 303, that one or more current beamforming settings for the microphone array are not optimized for the user's position in the location, an embodiment may, at 305, adjust the relevant beamforming settings for the microphone array to an optimized setting based on the user's position in the location.

In an embodiment, the setting adjustment may occur automatically without receipt of any additional setting adjustment input provided by a user. In an embodiment, one setting may be adjusted or, alternatively, a multitude of settings may be adjusted. The number and/or type of adjustments made to the beamforming settings are dictated by the identification of the user's contextual situation in the location and how well existing beamforming settings for the microphone array coincide with the user's situation. For instance, given a situation where a location contains a single user positioned a moderate distance to the left of the device, only a single beamforming setting needs to be adjusted (i.e., target direction) if the existing beamforming settings are optimized for a single user positioned a moderate distance in front of the device. Conversely, in another example, given a situation where a location contains a plurality of users spread out across a room, a multitude of beamforming settings needs to be adjusted if existing beamforming settings are optimized to detect input from a single user positioned directly in front of the device and close to the microphone array.

After beamforming settings are initially optimized for the user's position, an embodiment may continue to track the user's position and make subsequent adjustments so that the microphone array can always effectively register a user's voice input regardless of where they move to in the location. Tracking of the user's position may be facilitated by capturing user position data using one or more sensors (e.g., camera sensors, microphone sensors, etc.) and processing that data using one or more conventional user position tracking algorithms known in the art.

An embodiment may also dynamically adapt when the number of relevant users in the location changes. More particularly, an embodiment may further adjust beamforming settings responsive to detecting that another user has entered the location or that an existing user has left the location. For example, responsive to detecting a user addition to the location, an embodiment may dynamically widen a range of the microphone beam. Conversely, as another example, responsive to detecting a user subtraction in the location, an embodiment may dynamically narrow a range of the microphone beam. In yet another example, an embodiment may facilitate beamforming setting adjustment if a particular user's status has changed, regardless of whether they have left the location or not. For instance, an embodiment may identify from available context data that three individuals will be presenting in a location. After a first individual has concluded speaking, an embodiment may modify the beamforming settings so that they are no longer optimized for the first individual's position in the room because that individual will likely no longer be providing relevant input.

In an embodiment, a system may nullify a beamforming setting change responsive to receiving a user command to revert an adjusted beamforming setting back to its original state. For example, a user may not be pleased with one or more of the dynamically adjusted beamforming settings. In such a situation, they may provide a command input to revert the relevant settings back to their unadjusted state or manually adjust the beamforming settings to their desired setting. An embodiment may further update a ruleset associated with the optimized beamforming settings for the user's position in the location based on this user input.

The various embodiments described herein thus represent a technical improvement to conventional methods for adjusting microphone settings on a device. Using the techniques described herein, an embodiment may capture an image of a location and identify at least one position of a user in the location. An embodiment may then determine whether one or more beamforming settings for a microphone array are optimized for that user position. Responsive to determining that at least one beamforming setting for the microphone array is not optimized for the identified user position in the location, an embodiment may dynamically adjust the relevant setting(s) so that they are optimized for the user's position. Such a method may ensure that a device can always effectively register user voice input regardless of how they are positioned with respect to a device.

Additional details regarding the above discussed embodiments can be found in co-pending and commonly assigned U.S. patent application: "SYSTEM SETTING ADJUSTMENT BASED ON LOCATION". "RPS920210123-US-NP" which is filed concurrently herewith and incorporated by reference herein as if fully set forth herein.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    capturing, using at least one camera sensor coupled to an information handling device, an image of a location;
    identifying, based upon analysis of the captured image, at least one user position in the location;
    determining, using a processor, whether a beamforming setting for a microphone array is optimized for the at least one user position; and
    adjusting, responsive to determining that the beamforming setting for the microphone array is not optimized for the at least one user position, the beamforming setting to an optimized beamforming setting; and
    responsive to receiving, from the user, a command to revert the adjusted beamforming setting, updating a ruleset associated with the optimized beamforming setting based on the command.

2. The method of claim 1, wherein the identifying comprises identifying the at least one user position based upon context data present in the location.

3. The method of claim 2, wherein the context data is at least one article of data selected from the group of user position data, object position data, user number data, object number data, user identity data, object identity data, and combinations thereof.

4. The method of claim 1, wherein the at least one user position corresponds to at least one projected position of one or more users in the location.

5. The method of claim 1, wherein the beamforming setting is at least one setting selected from the group of a size of the beamforming array, a target direction of the beamforming array, a depth of the beamforming array, and combinations thereof.

6. The method of claim 1, wherein the adjusting comprises automatically adjusting without receipt of additional user input.

7. The method of claim 1, further comprising tracking, subsequent to the adjusting, movement of one or more users in the location using the optimized beamforming setting.

8. The method of claim 1, further comprising performing another adjustment action to the beamforming setting responsive to detecting one of: a user addition to the location or a user subtraction from the location.

9. The method of claim 8, wherein the another adjustment action corresponds to one of: a widening of a microphone beam responsive to the detection of the user addition or a narrowing of the microphone beam responsive to the detection of the user subtraction.

10. An information handling device, comprising:
at least one camera sensor;
a processor;
a memory device that stores instructions executable by the processor to:
capture an image of a location;
identify, based upon analysis of the captured image, at least one user position in the location;
determine whether a beamforming setting for a microphone array is optimized for the at least one user position; and
adjust, responsive to determining that the beamforming setting for the microphone array is not optimized for the at least one user position, the beamforming setting to an optimized beamforming setting; and
responsive to receiving, from the user, a command to revert the adjusted beamforming setting, update a ruleset associated with the optimized beamforming setting based on the command.

11. The information handling device of claim 10, wherein the instructions executable by the processor to identify comprise instructions executable by the processor to identify the at least one user position based upon context data present in the location.

12. The information handling device of claim 11, wherein the context data is at least one article of data selected from the group of user position data, object position data, user number data, object number data, user identity data, object identity data, and combinations thereof.

13. The information handling device of claim 10, wherein the at least one user position corresponds to at least one projected position of one or more users in the location.

14. The information handling device of claim 10, wherein the beamforming setting is at least one setting selected from the group of a size of the beamforming array, a target direction of the beamforming array, a depth of the beamforming array, and combinations thereof.

15. The information handling device of claim 10, wherein the instructions executable by the processor to adjust comprise instructions executable by the processor to automatically adjust without receipt of additional user input.

16. The information handling device of claim 10, wherein the instructions are further executable by the processor to track, subsequent to the adjusting, movement of one or more users in the location using the optimized beamforming setting.

17. The information handling device of claim 10, wherein the instructions are further executable by the processor to perform another adjustment action to the beamforming setting responsive to detecting one of: a user addition to the location or a user subtraction from the location.

18. The information handling device of claim 17, wherein the another adjustment action corresponds to one of: a widening of a microphone beam responsive to the detection of the user addition or a narrowing of the microphone beam responsive to the detection of the user subtraction.

19. A product, comprising:
a storage device that stores code, the code being executable by a processor and comprising:
code that captures an image of a location;
code that identifies, based upon analysis of the captured image, at least one user position in the location;
code that determines whether a beamforming setting for a microphone array is optimized for the at least one user position;
code that adjusts, responsive to determining that the beamforming setting for the microphone array is not optimized for that least one user position, the beamforming setting to an optimized beamforming setting; and
code that, responsive to receiving, from the user, a command to revert the adjusted beamforming setting, updates a ruleset associated with the optimized beamforming setting based on the command.

* * * * *